No. 713,438. Patented Nov. 11, 1902.
J. E. HORN.
BREACHY CATTLE YOKE.
(Application filed June 26, 1902.)
(No Model.)
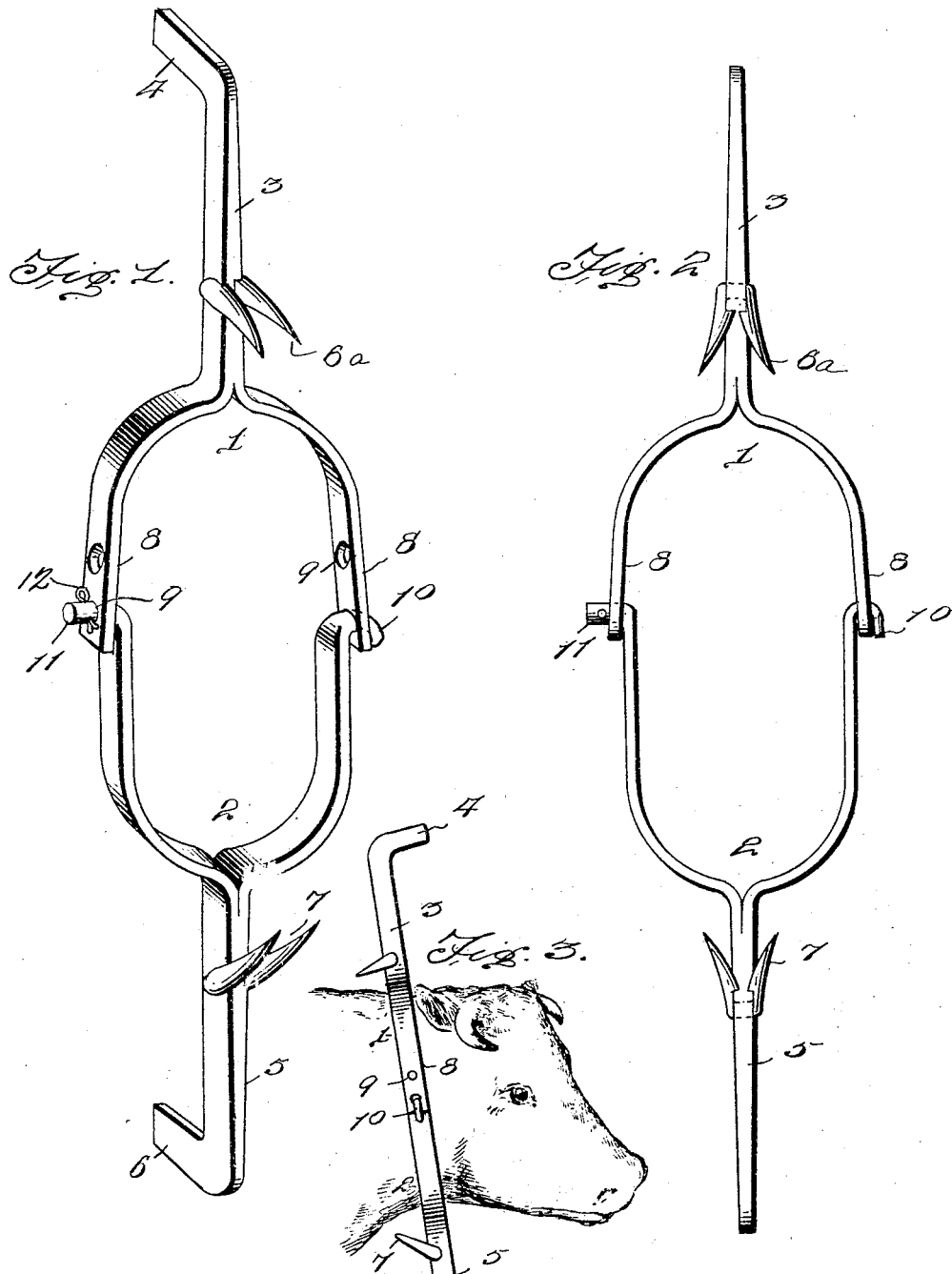

UNITED STATES PATENT OFFICE.

JOEL E. HORN, OF LAS ANIMAS, COLORADO.

BREACHY-CATTLE YOKE.

SPECIFICATION forming part of Letters Patent No. 713,438, dated November 11, 1902.

Application filed June 26, 1902. Serial No. 113,323. (No model.)

*To all whom it may concern:*

Be it known that I, JOEL E. HORN, a citizen of the United States, residing at Las Animas, in the county of Bent and State of Colorado, have invented a new and useful Breachy-Cattle Yoke, of which the following is a specification.

My invention is an improved yoke for use on cattle and horses to prevent them from breaking through fences and from attempting to pass through the same; and it consists in the peculiar construction and combination of devices hereinafter fully set forth and claimed.

In the accompanying drawings, Figure is a perspective view of my improved yoke. Fig. 2 is a rear elevation of the same. Fig. 3 is a side elevation showing my improved yoke applied.

In the embodiment of my invention I construct my improved yoke of a pair of sections 1 2, each of which is provided with an outwardly-extending arm. The arm 3 of the upper section 1 has its upper end turned forwardly to form a hook 4. The arm 5 of the lower section has a similar hook 6 formed at its lower end. The arm 3 is further provided on its rear side at a suitable distance from its lower end with a pair of downwardly and rearwardly inclined barbs 6, and similar barbs 7, which incline upwardly and rearwardly, are provided for the lower arm 5.

The fork-arms 8 of the upper section are each provided with a plurality of adjusting-openings 9. One of the fork-arms of the lower section has its upper end formed with a pivot-hook 10, adapted to engage an appropriate adjusting-opening 9 of one of the fork-arms of the upper section, and has its opposite fork-arm formed at its upper end with an outwardly-extending pivot-spindle 11, which is adapted to be inserted in an appropriate adjusting-opening 9 of the upper section. Thereby the upper and lower sections of the yoke may be pivotally connected together, as shown in the drawings, and it will be understood that by the provision of the plurality of openings 9 and the pivots 10 11, with which the fork-arms of the two sections are respectively provided, the sections may be adjustably pivotally connected together to enable the yoke to be varied in size, so that it will fit the neck of the animal which wears it. When the sections of the yoke have been thus adjusted and pivotally connected together, a split spring-key 12 is inserted in an opening with which the spindle 11 is provided, and thus the yoke-sections are prevented from coming apart while in use on the animal.

Under ordinary conditions the yoke is not an annoyance to the animal wearing it and does not prevent or interfere with the animal's grazing, moving about, or lying down; but when the animal attempts to get through a fence the arms 3 5 of the sections of the yoke by reason of the hooks with which the said arms are provided become engaged by the fence-wires, and as the animal attempts to push through the fence the respective sections of the yoke turn rearwardly on their pivotal connections and cause the barbs 6 7 to enter the neck and breast of the animal, thereby deterring it from any further attempt to get through the fence.

In practice my improved yoke is preferably made of steel or other suitable metal; but I do not limit myself in this particular.

Having thus described my invention, I claim—

A yoke of the class described comprising two sections, the fork-arms of one of said sections having openings, and the respective fork-arms of the other section being provided with a pivot-hook and a pivot-spindle to engage said openings and detachably pivot the said sections together, substantially as described.

In testimony that I claim the foregoing as my own I have hereto affixed my signature in the presence of two witnesses.

JOEL E. HORN.

Witnesses:
JNO. M. MOORE,
CAREY N. TROUP.